(12) United States Patent
Oishi

(10) Patent No.: US 9,466,264 B2
(45) Date of Patent: Oct. 11, 2016

(54) GRAPHIC METER DEVICE

(75) Inventor: Yukio Oishi, Shimada-shi (JP)

(73) Assignee: Yazaki Corporation, Tokyo (JP)

( * ) Notice: Subject to any disclaimer, the term of this patent is extended or adjusted under 35 U.S.C. 154(b) by 68 days.

(21) Appl. No.: 13/703,976

(22) PCT Filed: Apr. 12, 2011

(86) PCT No.: PCT/JP2011/059059
§ 371 (c)(1),
(2), (4) Date: Dec. 13, 2012

(87) PCT Pub. No.: WO2011/158545
PCT Pub. Date: Dec. 22, 2011

(65) Prior Publication Data
US 2013/0100164 A1    Apr. 25, 2013

(30) Foreign Application Priority Data
Jun. 16, 2010    (JP) .................................. 2010-137043

(51) Int. Cl.
*B60K 35/00*    (2006.01)
*B60K 37/02*    (2006.01)
(Continued)

(52) U.S. Cl.
CPC ................. *G09G 5/20* (2013.01); *B60K 35/00* (2013.01); *B60K 37/02* (2013.01); *G01D 7/06* (2013.01); *G01D 11/28* (2013.01); *B60K 2350/106* (2013.01); *B60K 2350/1064* (2013.01); *B60K 2350/1072* (2013.01); *B60K 2350/2008* (2013.01); *B60K 2350/408* (2013.01); *B60K 2350/965* (2013.01); *G02B 26/00* (2013.01); *G09G 5/00* (2013.01); *G09G 5/14* (2013.01); *G12B 11/04* (2013.01)

(58) Field of Classification Search
None
See application file for complete search history.

(56) References Cited

U.S. PATENT DOCUMENTS 4,408,198 A * 10/1983 Kudirka ...................... 345/469.1
4,808,198 A *  2/1989 Richter ....................... 48/197 R
(Continued)

FOREIGN PATENT DOCUMENTS

JP    2000-221915 A    8/2000
JP    2001-304919 A    10/2001
(Continued)

OTHER PUBLICATIONS

Wayback, Mondaine Official Swiss Railways Watch, 2010.*
(Continued)

*Primary Examiner* — Ming Hon
*Assistant Examiner* — Yu-Jang Tswei
(74) *Attorney, Agent, or Firm* — Locke Lord LLP

(57) ABSTRACT

There is provided a graphic meter device which improves the visibility of a needle and which allows for easy determination of the kind of indicator. The graphic meter device includes a dot matrix display (8) for displaying a needle indicator image (9) provided with a dial (10*a*) and a needle (10*b*) pointing to the dial (10*a*) in accordance with a measured quantity and a CPU (1) for controlling a display state of the dot matrix display (8), the CPU being arranged to display a colored region (10*f*) of the needle (10*b*) of the dial (10*a*) with a color different from the rest of the region in the dial (10*a*).

3 Claims, 3 Drawing Sheets

(51) Int. Cl.
  *G09G 5/20* (2006.01)
  *G01D 7/06* (2006.01)
  *G01D 9/18* (2006.01)
  *G09G 5/00* (2006.01)
  *G02B 26/00* (2006.01)
  *G12B 1/00* (2006.01)
  *G09G 5/14* (2006.01)
  *G01D 11/28* (2006.01)
  *G12B 11/04* (2006.01)

(56) References Cited

U.S. PATENT DOCUMENTS

| 8,279,141 B2 | 10/2012 | Katoh et al. | |
| 2008/0211652 A1* | 9/2008 | Cope et al. | 340/461 |
| 2008/0238818 A1* | 10/2008 | Katoh et al. | 345/55 |

FOREIGN PATENT DOCUMENTS

| JP | 2005-308489 A | 11/2005 |
| JP | 2008-241472 A | 10/2008 |

OTHER PUBLICATIONS

DetailsArt.com , "Spring Bouquet Clock Allen Designs", 2007.*
Wayback, "chillichilly clock will have you seeing double", Feb. 6, 2010, Technabob.*
International Search Report dated May 24, 2011, issued for PCT/JP2011/059059.
Office Action dated Aug. 6, 2013, issued for the corresponding Japanese patent application No. 2010-137043 and English translation thereof.

* cited by examiner

GRAPHIC METER DEVICE

TECHNICAL FIELD

The present invention relates to a graphic meter device for displaying on a display device such as a liquid crystal display a needle indicator image having a dial and a needle.

BACKGROUND ART

Conventionally, for a vehicle indicator, it is popular to use an analog indicator provided with a dial and a needle and such. However, a conventional mechanical indicator has problems such as an increase in depth size and an increase in number of parts. Contrary, there is a meter (i.e. a graphic meter device) in which an analog indicator is graphically displayed on a display surface of a liquid crystal panel such as an electronic meter for vehicle disclosed in Patent Document 1. According to such electronic meter for vehicle, the depth size can be reduced as well as number of parts can be reduced.

CITATION LIST

Patent Document 1: Japanese Patent Application Publication No. 2000-221915

SUMMARY OF INVENTION

Problems to be Solved

The above-described graphic meter device has a problem that, since a needle and a dial are drawn as images on the same display, it is difficult to discriminate scales and scale markings of the from the needle.

Furthermore, there is proposed a graphic meter device in which a plurality of indicators such as a fuel indicator and a revolution indicator can be switched in accordance with a driving condition and a setting and such. In this case, however, there is a problem that it is difficult for a driver to instantly determine which indicator is being displayed.

In view of the above-described problems, an object of the present invention is to provide a graphic meter device which improves visibility of a needle and which allows for easy determination of the kind of indicator.

How to Solve Problems

In order to achieve the above-described object, the present invention provides, according to a first aspect, a graphic meter device including: a display unit for displaying a needle indicator image provided with a dial and a needle pointing to the dial in accordance with a measured quantity; and a display control unit for controlling a display state of the display unit, wherein the display control unit is arranged to display a fixed region located around a tip end of the needle in the dial such that the fixed region is colored different from the rest of the region in the dial.

The present invention provides, according to a second aspect, the graphic meter device according to the first aspect in which the display control unit is arranged to display the fixed region such that the color of the fixed region gradually becomes lighter with increasing distance from the needle.

The present invention provides, according to a third aspect, the graphic meter device according to the first or the second aspect in which the display control unit is capable of switching between a plurality of kinds of needle indicator images displayed on the display unit, and the display control unit is arranged to display the fixed regions of the plurality of kinds of needle indicator images using different colors with respect to each other.

Advantageous Effects of the Invention

According to the first aspect of the present invention described above, the display control unit colors the fixed region located around the tip end of the needle in the dial using a color different from the rest of the region. Consequently, the location of the needle can be discriminated easily, thereby improving the visibility of the needle.

According to the second aspect of the present invention described above, the display control unit is arranged to display the fixed region such that the color of the fixed region gradually becomes lighter with increasing distance from the needle. Thus, the location with the darkest color corresponds to the location of the needle, so the location of the needle can be discriminated even more easily.

According to the third aspect of the present invention described above, the display control unit is arranged to display the fixed regions of the plurality of kinds of needle indicator images using different colors with respect to each other. Thus, it is easy to determine which kind of needle indicator image is being displayed, allowing for easy distinction between the kinds of indicator.

DESCRIPTION OF EXEMPLARY EMBODIMENTS

Figure 1:
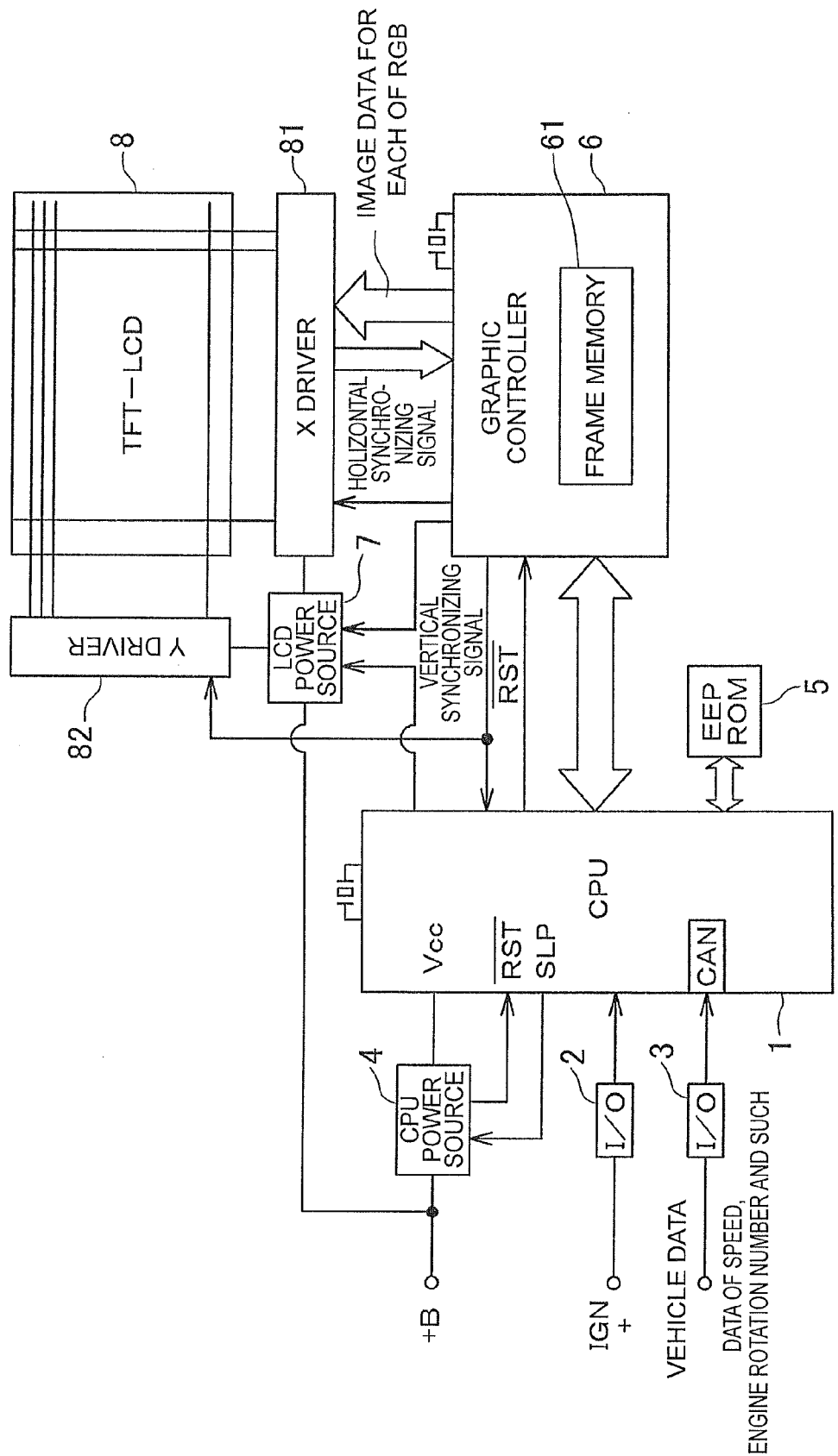
FIG. 1 is a block diagram of a graphic meter according to one embodiment of the present invention.

In the following, one embodiment of the present invention is explained in reference with FIG. 1 through FIG. 4. As shown in FIG. 1, a graphic meter according to one embodiment of the present invention includes a CPU 1, an I/O 2, 3, a CPU power source 4, an EEPROM 5, a graphic controller 6, a LCD power source 7 and a dot matrix display 8.

The dot matrix display 8 as a display unit is composed of a TFT-LCD (liquid crystal display), for example. The dot matrix display 8 functions as a full-graphic meter capable of color display and displays on a display panel images of a speedometer indicative of running speed, a revolution indicator indicative of number of revolutions of engine and a fuel indicator indicative of fuel level and such in accordance with various detected signals obtained from a vehicle. In the present invention, the dot matrix display 8 is not limited to a TFT-LCD (liquid crystal display), but it may be other display devices capable of color display such as an EL (electroluminescence) display.

The CPU 1 as a display control unit receives, at a CAN communication unit, various detected signals related to detected running condition of the vehicle, such as a running speed signal (SPEED), from a vehicle-side node via the data I/O 3. The CAN communication unit uses CAN (Controller Area Network) as a communication protocol. The CPU 1 processes the received detected signal such as the running speed signal (SPEED) to produce image data having a plurality of image layer structures and supplies that image data to the graphic controller 6.

The process for generating image data is synchronized with a later-described vertical synchronizing signal from the graphic controller 6. That is, the graphic controller 6 outputs the vertical synchronizing signal to a Y driver 82 of the dot matrix display 8 and to the CPU 1. Then, the CPU 1 is synchronized with this vertical synchronizing signal to produce image data for one screen and temporally stores the produced image data to a RAM not shown. When the next vertical synchronizing signal is detected, the CPU 1 outputs the image data for one screen to the graphic controller 6.

The graphic controller 6 outputs the vertical synchronizing signal to the Y driver 82 of the dot matrix display 8 and outputs a horizontal synchronizing signal to a X driver 81 of the dot matrix display 8 together with image data for one scan line. The Y driver 82 sequentially-outputs display signals corresponding to each scan line during one period of the vertical synchronizing signal, and the X driver 81 sequentially-outputs display signals corresponding to each pixel of one scan line during one period of the vertical synchronizing signal.

In other words, in the graphic controller 6, the display signal which is converted into RGB signal, gradation signal or the like is synchronized with the horizontal synchronizing signal via the X driver 81 and transferred to each pixel of the dot matrix display 8. Meantime, the display signal is synchronized with the vertical synchronizing signal at the Y driver 82 and transferred to each pixel, thus a pixel at an intersection point of the indication signals of the X driver 81 and the Y driver 82 becomes at an indication state. Furthermore, by scanning the X driver 81 and the Y driver 82 at a constant time, an image for one screen is formed entirely on a display screen of the dot matrix display 8. In other words, this is a raster-scan display.

The CPU power source 4 supplies power to the CPU 1. The LCD power source 7 supplies power to the dot matrix display 8. The EEPROM 5 is a non-volatile memory in which control program operated by the CPU 1 and image data to be displayed on the dot matrix display 8 and such are pre-stored.

Figure 2:
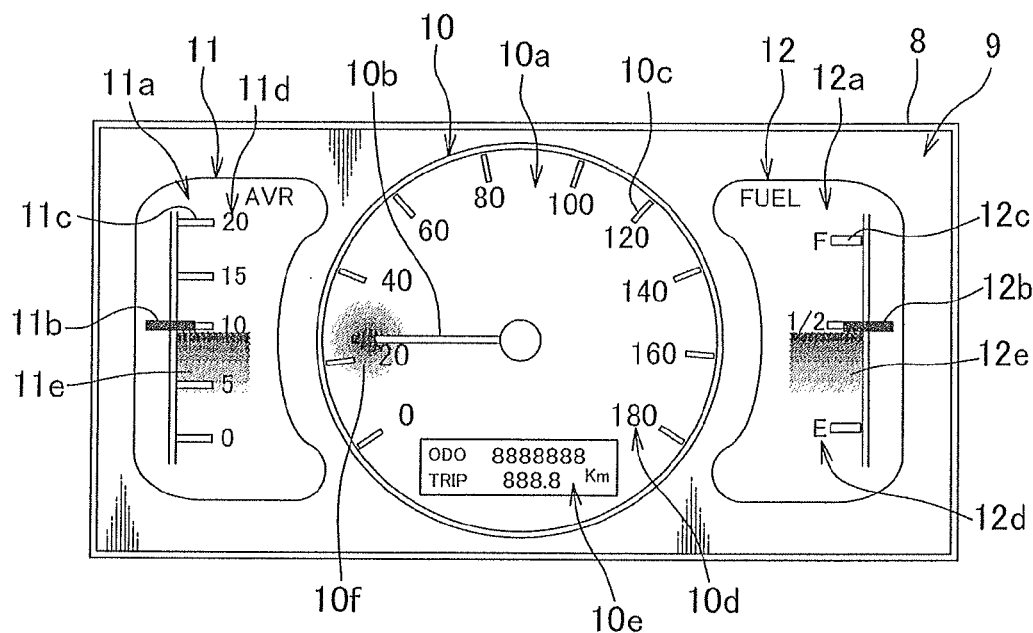
FIG. 2 is an illustration showing a needle indicator image displayed on the graphic meter of FIG. 1.
Figure 3:
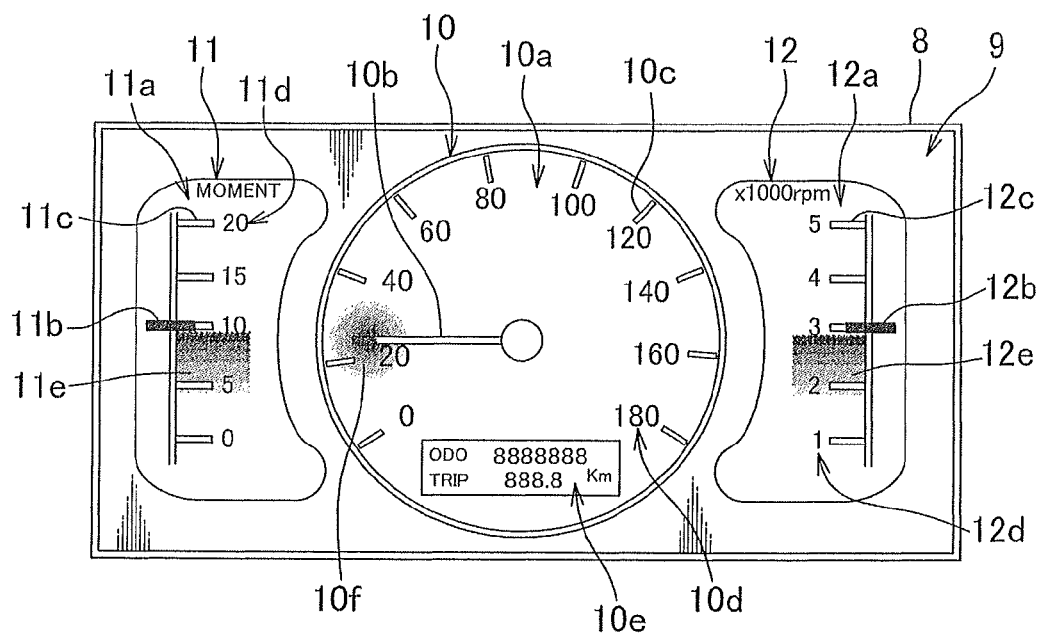
FIG. 3 is an illustration showing a needle indicator image displayed on the graphic meter of FIG. 1.

Referring to FIGS. 2 and 3, there is shown an exemplary needle indicator image 9 displayed on the dot matrix display 8. The needle indicator image 9 includes a speedometer display region 10 for displaying a running speed arranged at a central portion and a first indicator display region 11 arranged on the left side of the speedometer display region 10 and which can display, in a switching fashion, an average fuel consumption indicator indicative of average fuel consumption of vehicle and an instant fuel consumption indicator indicative of instant fuel consumption. The needle indicator image 9 further includes a second indicator display region 12 arranged on the right side of the speedometer display region 10 and which can display, in a switching fashion, a fuel indicator indicative of fuel level of vehicle and a revolution indicator indicative of the number of revolutions of engine.

The speedometer display region 10 is displayed so as to represent a meter design having a substantially-circular dial 10*a* indicative of measured amount of the running condition of vehicle. In the speedometer display region 10, there are displayed a needle 10*b* extending from a support point located at a center of the substantially-circular dial 10*a*, a scale 10*c* extending in a radial direction of the substantially-circular dial 10*a* and a scale mark 10*d* showing a scale value of the scale 10*c*. For the speedometer display region 10, the scales 10*c* and the needle 10*b* together constitute an analog speedometer. That is, the needle 10*b* is displayed capable of rotating around the support point so that a tip end of the needle 10*b* points to the above-described scale to indicate the running speed value of the vehicle.

Furthermore, there is provided an odometer or a trip meter display region 10*e* located at a lower portion of the dial 10*a* to indicate an odometer or a trip meter of the vehicle.

The speedometer display region 10 includes a colored region 10*f* which is a predetermined fixed region arranged around a location at which the tip end of the needle 10*b* of the dial 10*a* is located. This colored region 10*f* is colored with a color different from the rest of the region in the dial 10*a*. The colored region 10*f* is colored such that a portion at which the needle 10*b* is located has a darkest color and the color gradually becomes lighter with increasing distance from the tip end of the needle 10*b* (i.e. colored in a gradational fashion). Of course, this colored region 10*f* moves together with the movement of the needle 10*b*.

As shown in FIGS. 2 and 3, the tip end of the needle 10*b* is also colored. The color of the tip end of the needle 10*b* may be similar to the color of the colored region 10*f* and may have the same color strength as the darkest-colored portion of the colored region 10*f*. Alternatively, the color of the tip end of the needle 10*b* may be different from the colored region 10*f*.

In the first indicator display region 11, there is displayed a meter design having a substantially-rectangular dial 11*a* and arranged capable of displaying, in a switching fashion, the average fuel consumption indicator and the instant fuel consumption indicator. Furthermore, in the first indicator display region 11, there are also displayed a needle 11*b* extending in a lateral direction of the dial 11*a* so as to extend over a below-described scale 11*d* and being movable along an up-and-down direction of the dial 11*a*, a scale 11*c* extending in the lateral direction of the dial 11*a* and the scale mark 11*d* indicating a scale value of the scale 11*c*.

In case of FIG. 2, the first indicator display region 11 is arranged as a meter (i.e. an indicator) which indicates the average fuel consumption value using the scale 11*c* and the needle 11*b*. That is, the needle 11*b* is displayed so as to move in the up-and-down direction so the needle 11*b* points to the scale 11*c* to indicate the average fuel consumption value of the vehicle. In case of FIG. 3, the first indicator display region 11 is arranged as a meter (i.e. an indicator) which indicates the instant fuel consumption value using the scale 11*c* and the needle 11*b*. That is, the needle 11*b* is displayed so as to move in the up-and-down direction so the needle 11*b* points to the scale 11*c* to indicate the instant fuel consumption value of the vehicle.

The first indicator display region 11 is colored such that a colored region 11*e* corresponding to a predetermined fixed region located at a lower side of the needle 11*b* of the dial 11*a* is colored with a color different from the rest of the region of the dial 11*a*. The colored region 11*e* is colored such that a portion at which the needle 11*b* is located has a darkest color and the color gradually becomes lighter with increasing distance from the needle 11*b* (i.e. colored in a gradational fashion). Of course, this colored region 11*e* moves together with the movement of the needle 11*b*.

In addition, in FIGS. 2 and 3, the needle 11*b* is also colored. The color of the needle 11*b* may be similar to the color of the colored region 11*e* and may have the same color strength as the darkest-colored portion of the colored region 11*e*. Alternatively, the color of the needle 11*b* may be different from the colored region 11*e*.

In the second indicator display region 12, there is displayed a meter design having a substantially-rectangular dial 12a which is capable of displaying, in a switching fashion, the fuel indicator and the revolution indicator. Furthermore, in the second indicator display region 12, there are also displayed a needle 12b extending in a lateral direction of the dial 12a so as to extend over a below-described scale 12d and being movable along an up-and-down direction of the dial 12a, a scale 12c extending in the lateral direction of the dial 12a and the scale mark 12d indicating a scale value of the scale 12c.

In case of FIG. 2, the second indicator display region 12 is arranged as a meter (i.e. an indicator) which indicates the fuel level value using the scale 12c and the needle 12b. That is, the needle 12b is displayed so as to move in the up-and-down direction so the needle 12b points to the scale 12c to indicate the fuel level value of the vehicle. In case of FIG. 3, the second indicator display region 12 is arranged as a meter (i.e. an indicator) which indicates the number of revolutions of engine with the scale 12c and the needle 12b. That is, the needle 12b is displayed so as to move in the up-and-down direction so the needle 12b points to the scale 12c to indicate the number of revolutions of engine of the vehicle.

The second indicator display region 12 is colored such that a colored region 12e corresponding to a predetermined fixed region located at the lower side of the needle 12b of the dial 12a is colored with a color different from the rest of the region of the dial 12a. The colored region 12e is colored such that a portion at which the needle 12b is located has a darkest color while the color gradually becomes lighter with increasing distance from the needle 12b (i.e. colored in a gradational fashion). Of course, this colored region 12e moves together with the movement of the needle 12b.

In addition, in FIGS. 2 and 3, the needle 12b is also colored. The color of the needle 12b may be similar to the color of the colored region 12e and may have the same color strength as the darkest-colored portion of the colored region 12e. Alternatively, the color of the needle 12b may be different from the colored region 12e.

As described above, the first indicator display region 11 and the second indicator display region 12 are arranged in a manner capable of displaying the two kinds of meters by switching the two kinds of meters, i.e. the state shown in FIG. 2 and the state shown in FIG. 3. Therefore, the colored region 10f, 11e, 12e changes its color according to the kind of meter, i.e. according to the state shown in FIG. 2 and the state shown in FIG. 3.

Figure 4:
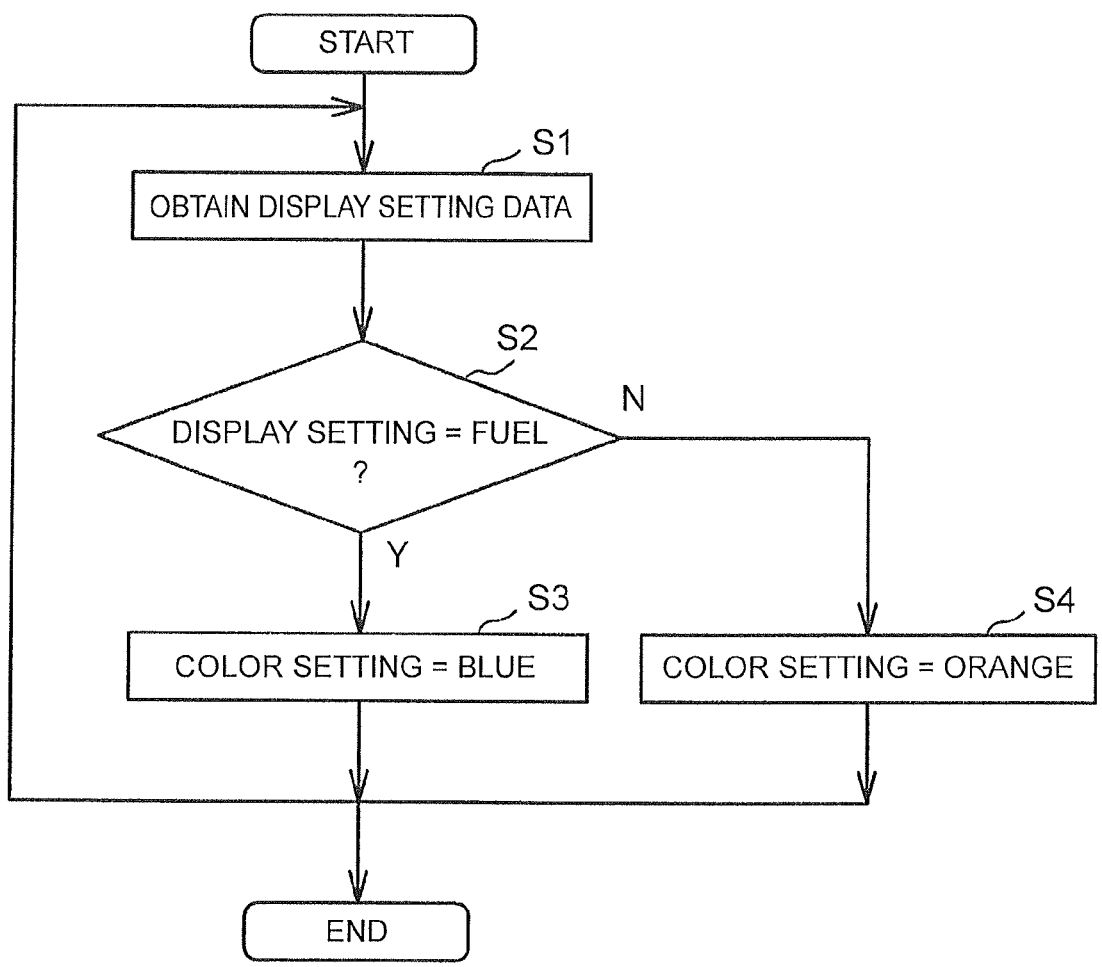
FIG. 4 is a flow chart showing a color-changing operation of the graphic meter shown in FIG. 1.

Next, color change operation of the graphic meter having the above-described arrangement is explained in reference with a flow chart shown in FIG. 4. The flow chart shown in FIG. 4 is performed by the CPU 1.

Firstly, in step S1, display setting data is obtained and the step proceeds to step S2. The display setting data is information indicative of whether the second indicator display region 12 is displaying the fuel indicator or the revolution indicator. This information is obtained from information stored in the memory in the CPU 1 or from a signal from an operation switch not shown for manually performing the switching.

Next, in step S2, it is determined whether the display setting is FUEL (i.e. the fuel indicator) or not, and if it is determined as the fuel indicator (i.e. if Y), then the step proceeds to step S3, or if it is determined as not the fuel indicator (i.e. if N), then the step proceeds to step S4.

Next, in step S3, according to the display setting indicating the fuel indicator, the color setting for the colored region 10f, 11e, 12e is set to blue.

In contrast, in step S4, according to the display setting indicating not the fuel indicator, i.e. indicating the revolution indicator, the color setting for the colored region 10f, 11e, 12e is set to orange.

In addition, in the flow chart shown in FIG. 4, step S2 may perform the determination using information indicating whether the first indicator display region 11 is displaying the average fuel indicator or the instant fuel indicator, instead of the information indicating whether the second indicator display region 12 is displaying the fuel indicator or the revolution indicator. Furthermore, the color of the colored region is not limited to blue and orange; however it is preferable to employ the color which allows for clear recognition of the change in the kind of meter displayed in the first indicator display region 11 and in the second indicator display region 12.

According to this embodiment, for the needle indicator image displayed on the dot matrix display 8 of the graphic meter, there is provided the colored region 10f, 11e, 12e corresponding to the fixed region located around the location of the needle 10b, 11b, 12b in the dial 10a, 11a, 12a, the colored region being colored with a color different from the rest of the region in the dial 10a, 11a, 12a. Furthermore, the colored region 10f, 11e, 12e is colored such that the portion at which the needle 10b, 11b, 12b is located has a darkest color, while the color gradually being lighter with increasing distance from the needle 10b, 11b, 12b. Consequently, the portion having the darkest color corresponds to the location of the needle, and thus the location of the needle 10b, 11b, 12b can be discriminated easily, improving the visibility of the needle.

Moreover, the color for the colored regions 10f, 11e, 12e is changed in different colors with respect to each other according to the content (kind) of the meter displayed in the first indicator display region 11 and the second indicator display region 12. Consequently, the contents of the meter can be determined easily based on the color, allowing it easy to determine the kinds of meters.

In the above-described embodiment, the first indicator display region 11 and the second indicator display region 12 include the colored region 11e, 12e located at the lower side of the needle 11b, 12b; however, the colored region may be arranged at an upper side of the needle, or may be arranged at both of the upper and lower sides of the needle as long as it is located around the needle 11b, 12b. Furthermore, in the above-described embodiment, when the needle 11b, 12b points to the lowermost scale 11d, 12d most of the colored region 11e, 12e cannot be displayed; so for this reason, the location of the colored region 11e, 12e may be switched between the upper side and the lower side in accordance with the position of the needle 11b, 12b.

Furthermore, the above-described embodiment is arranged so as to switch the two kinds of meters; however there may be three kinds of meters. In this case, obviously the colors used for the colored region 10f, 11e, 12e are three colors or more.

The embodiments described herein are only representative embodiments of the present invention, and the present invention is not limited to these embodiments. That is, the shown embodiments can be modified or changed in various ways without departing from the scope of the present invention.

LIST OF REFERENCE SIGNS

1 CPU (display control unit)
8 dot matrix display (display unit)

9 needle indicator image
10a dial
10b needle
10f colored region (fixed region located around needle)
11a dial
11b needle
11f colored region (fixed region located around needle)
12a dial
12b needle
12f colored region (fixed region located around needle)

The invention claimed is:

1. A graphic meter device comprising:
a display unit for displaying a needle indicator image including a plurality of indicator display regions, wherein in each of the plurality of indicator display regions, a meter provided with a dial and a needle pointing to the dial in accordance with a measured quantity is displayed; and
a display control unit for controlling a display state of the display unit,
wherein the display control unit displays a fixed region located around a tip end of the needle in the dial of each of the plurality of indicator display regions such that the fixed region is colored different from the rest of the region in the dial,
wherein the display control unit is configured to switch a kind of the meter displayed in at least one of the plurality of indicator display regions to another kind,
wherein when the kind of the meter in at least one of the plurality of indicator display regions is switched to the another kind, a color of the fixed regions in all of the plurality of indicator display regions is changed by the display control unit,
wherein the tip end of the needle is in a darkest color in the dial, and
wherein the farther from the tip end of the needle, the lighter a color in the region becomes in a gradational fashion.

2. The graphic meter device according to claim 1, wherein the display control unit displays the fixed regions such that the color gradually becomes lighter with increasing distance from the needle.

3. The graphic meter device according to claim 1, wherein the color of the tip end of the needle is different from a color of the fixed regions.

\* \* \* \* \*